(12) United States Patent
Chemburkar

(10) Patent No.: US 6,301,773 B1
(45) Date of Patent: Oct. 16, 2001

(54) METHOD OF MANUFACTURING A MOTOR CORE

(75) Inventor: Dilip V. Chemburkar, El Paso, TX (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 08/966,921

(22) Filed: Nov. 10, 1997

(51) Int. Cl.$^7$ ................................................. H02K 15/02
(52) U.S. Cl. ..................... 29/596; 29/609; 156/269; 156/290; 156/307.7; 310/42; 310/218
(58) Field of Search .................. 29/596, 609; 156/307.7, 156/290, 269; 310/217, 218, 42

(56) References Cited

U.S. PATENT DOCUMENTS

| | | |
|---|---|---|
| 1,158,463 | 11/1915 | Eaton . |
| 1,449,371 | 3/1923 | Apple . |
| 1,654,306 | 12/1927 | Paszkowski . |
| 1,756,672 | 4/1930 | Barr . |
| 1,877,254 | 9/1932 | Ritter . |
| 1,974,406 | 9/1934 | Apple . |
| 2,057,503 | 10/1936 | Sawyer . |
| 2,304,607 | 12/1942 | Sleeter . |
| 2,653,208 | 9/1953 | Ballman . |
| 2,680,285 | 6/1954 | Furnas . |
| 2,783,404 | 2/1957 | Appenzeller . |
| 3,293,471 | 12/1966 | De Jean et al. . |
| 3,670,407 | 6/1972 | Mewhinney et al. . |
| 3,778,892 | 12/1973 | Ostroski . |
| 3,821,846 * | 7/1974 | Pleiss, Jr. et al. .................. 29/596 |
| 4,734,975 * | 4/1988 | Ballard et al. .................. 29/609 X |
| 5,176,946 | 1/1993 | Wieloch . |

* cited by examiner

Primary Examiner—Carl E. Hall
(74) Attorney, Agent, or Firm—Welsh & Katz, Ltd.; Damian G. Wasserbauer; Carl B. Horton

(57) ABSTRACT

A method for manufacturing a motor core having a plurality of metallic plate-like laminations includes the steps of a) juxtaposing the laminations in a stacked relation, b) placing the laminations over an alignment post of an alignment fixture, c) flowing at least one bead of hardenable adhesive material along the outer peripheral surface of the laminations where the adhesive material, when cured, fixes the laminations in a predetermined non-moving orientation, d) removing the laminations from the alignment fixture; and e) applying windings to the laminated stack.

16 Claims, 1 Drawing Sheet

METHOD OF MANUFACTURING A MOTOR CORE

FIELD OF THE INVENTION

The present invention relates generally to motor cores and stators and more particularly to a method of manufacturing a motor core by adhesively bonding laminated layers without applying compression to the layers.

BACKGROUND OF THE INVENTION

Motor cores are generally composed of many layers of thin metal plates that are stacked on top of each other to form a laminated stack. Typically, the laminated stack is fastened with welds, rivets, or bolts which hold and/or compress the layers together to permanently maintain the stack in a fixed orientation. Stator windings are then fitted about or wound in place about grooves or slots formed in the inside peripheral surface of the laminated stack to form poles of the motor. During processing of the metal plates and prior to assembly, the plates are annealed to form an oxide layer on the surfaces of each metal plate. The oxide layer effectively insulates one plate from the adjacent plate, provided that the plates are not subject to significant compression. Use of rivets or bolts that compress the stack "shorts-out" the oxide layer causing some or all of the metal layers to be electrically coupled to adjacent layers, essentially "short circuiting" the stack forming a conductor. Welding the layers together similarly creates a short circuit between the plates. In some motor applications this is acceptable, and even desirable.

However, in other motor applications, this is not acceptable, as shorted plates reduce the efficiency of the motor by increasing eddy current loss in the stack. In such applications, the metal layers must be electrically isolated from adjacent layers. Such stacks are referred to as "loosely laminated" stacks because the metal plates are not subject to significant compressive force. Typically, applications requiring a loosely laminated stack are directed toward smaller motors, such as fractional horsepower motors in the range of one-half to one horsepower. However, some loosely laminated stack motors may be as large as five horsepower. The loosely laminated stack must be fixed so as to prevent the metal plates from becoming skewed while simultaneously avoiding detrimental compressive force.

It is known to use clamps to hold the plates in position while the windings are attached or wound about the slots or grooves in the stack. This is costly and labor intensive, and care must be taken not to apply too much compressive force. Application of too much compressive force results in shorting some or all of the laminations, while application of too little compressive force permits the plates to move, resulting in air gaps between the laminations and skewed laminations. Accordingly, use of clamps is disadvantageous in the manufacturing of loosely laminated stacks.

In some applications, large clamping or compressive force is used in conjunction with a chemical adhesive. Of course, a loosely laminated core cannot be manufactured in this way. Such methods use slow-curing adhesives that require the core to remain under compression for relatively long periods of time while the adhesive hardens. Application of such compressive force may involve expensive and bulky fixtures and is an inefficient use of manufacturing floor space. Also, such methods using adhesive are disadvantageous if large compressive force is not used. Without use of substantial compressive force, the cores may suffer from lack of rigidity and lack of squareness if the glue is not permitted to harden, undisturbed, for a relatively long period of time. Therefore, compression of the core is required during this time to insure dimensional accuracy. As described above, such compression causes shorting between the layers, thus this method cannot be used to produce loosely laminated cores.

It is also known to provide a cylindrical bore through the stack that is filled with a chemical adhesive, which when dry, bonds the layers together. Again, this is expensive and time consuming. In known methods, it is difficult to keep all of the metal layers aligned. Failure to maintain alignment between the metal layers results in "skew," which severely reduces the efficiency of the motor, thus affecting motor performance. Skewed motor cores are unacceptable.

SUMMARY OF THE INVENTION

It is therefore desirable to provide a loosely laminated stack and a method of forming the loosely laminated stack. The cost of manufacturing the loosely laminated stack is significantly reduced because complex and bulky jigs and clamps are not required to hold the laminations in place. Further, there is no expensive welding operation required and no bolts, rivets, or other mechanical fasteners are used. This reduces material and labor costs. Quality control costs are similarly reduced because the laminations are not subject to significant compressive force. This results in fewer rejections due to shorted laminations.

In the present method, the operator need only place the laminations over the alignment post and flow several beads of adhesive material along the outside surface of the laminated stack. The adhesive material cures and hardens in only a few seconds. Accordingly, the laminated stack, once aligned and fixed in place by the adhesive, is ready for the winding process.

More specifically, a method of manufacturing a motor core having a plurality of metallic plate-like laminations includes the steps of a) juxtaposing the laminations in a stacked relation along a central axis, the laminations having a central aperture and an outer peripheral surface, b) placing the laminations over an alignment post of an alignment fixture to align the laminations, until the laminations rest upon a base portion of the alignment fixture, where the alignment post has an outside diameter substantially equal to an inside diameter of the central aperture so as to form a slip fit therebetween to urge the laminations into full alignment, c) flowing at least one bead of hardenable adhesive material along the outer peripheral surface of the laminations in a generally vertical orientation between a top lamination and a bottom lamination where the adhesive material, when cured, fixes the laminations in a predetermined non-moving orientation, d) removing the laminations from the alignment fixture; and e) applying windings to the laminations. Other features and advantages of the invention will become apparent from the description that follows.

DETAILED DESCRIPTION OF THE INVENTION

Figure 1:
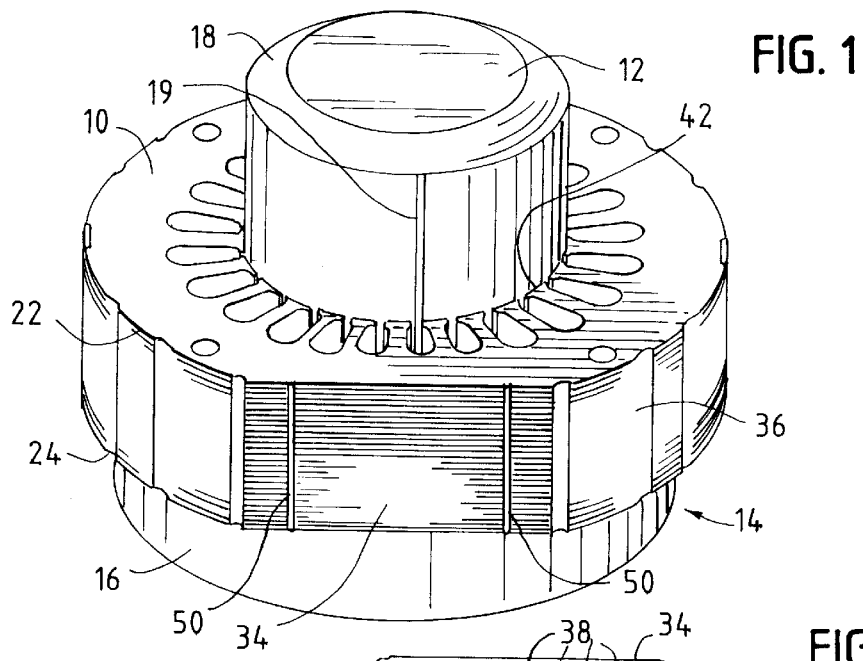
FIG. 1 is a perspective view of a laminated stack and an alignment fixture.
Figure 2:
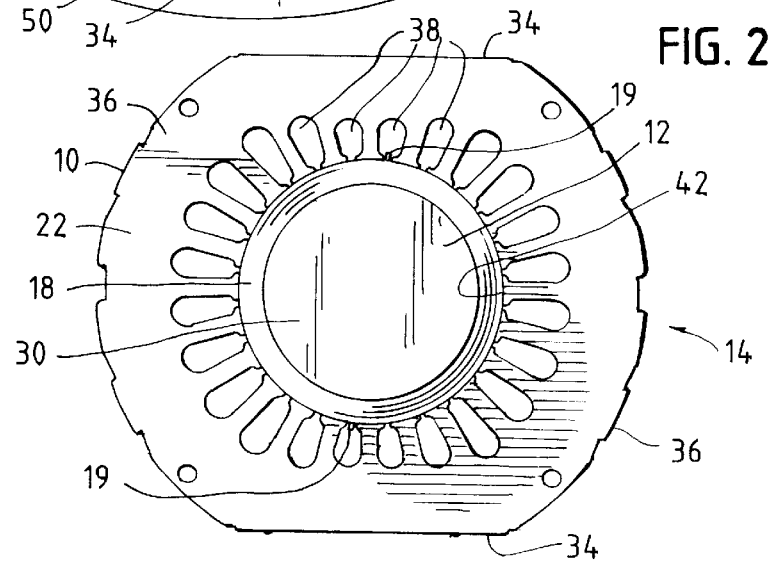
FIG. 2 is a top plan view of the laminated stack and the alignment fixture of FIG. 1.
Figure 3:
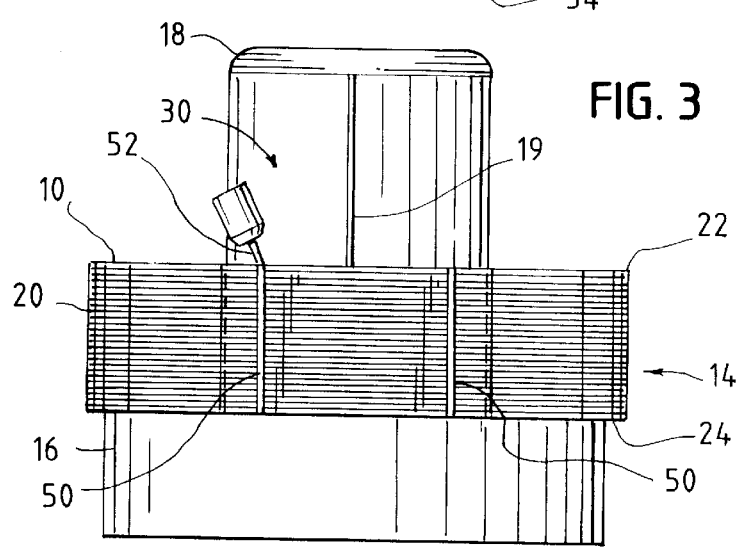
FIG. 3 is a side elevational view of the laminated stack and the alignment fixture of FIG. 1.

Referring now to FIGS. 1–3, FIG. 1 shows a specific embodiment of a laminated stack or motor core 10 disposed over an alignment post 12 of an alignment fixture 14. The alignment fixture 14 includes the alignment post 12 fixed to a base portion 16 at a ninety degree angle. Preferably, the alignment post 12 is disposed in the center of the base portion 16 and may be integrally formed with the base portion, or it may be removable. The alignment fixture 14 is formed of hardened steel, tool steel, or other suitable durable material. The alignment post 12 has a slightly tapered or rounded distal portion 18 that facilitates initial alignment and orientation of the laminated stack 10 over the alignment post. Two oppositely disposed keys 19 extend axially along the surface of the alignment post 12. Placing the laminated stack 10 over the alignment post 12 eliminates skew between the layers 20 and aligns the stack, as will be described below.

The laminated stack 10 is formed of many layers of metallic plate-like laminations or layers 20 having a thickness of about 0.025 inches, hereinafter interchangeably referred to as layers, plates, or laminations. However, depending upon the motor construction, the dimensions of the layers 20 may vary in thickness, width, and general surface area configuration. As best shown in FIGS. 1 and 3, the laminated stack 10 includes an upper or top lamination 22 and a lower or bottom lamination 24. Each layer or plate 20 is generally circular in shape having a central aperture 30. Each lamination 20 preferably includes two flat portions 34 forming chord-like surfaces on an outer peripheral surface 36 when the laminations are stacked. However, any suitable number of flat portions 34 may be included. As best shown in FIGS. 1–2, the laminated stack 10 includes a plurality or U-shaped grooves or slot openings 38 disposed about the central aperture 30. The slot openings 38 form corresponding slot tooth portions 40 about which copper wire is wound to form the winding (not shown) of the motor core 10.

In operation, the plurality of the metal plates 20 are stacked in a juxtaposed relation such that the slot openings 38 are aligned along the entire height of the laminated stack 10. The stacked laminations 20 are then placed over the alignment post 12 such that the alignment post is received within the central aperture 30. The slot openings 38 are initially aligned so that when the laminated stack 10 is placed over the alignment post 12, the outwardly projecting keys 19 engage corresponding slot openings so as to maintain each plate 20 in the same orientation relative to an adjacent plate. This eliminates skew. Preferably, the alignment post 12 includes two keys 19, however one or more keys may be used. The laminated stack 10 is placed over the alignment post 12 until the stack rests on the base portion 16 of the alignment fixture 14. The bottom layer or plate 24 directly contacts the base portion 16 and is parallel to the base portion such that there is no "wobble" possible. Accordingly, a central axis of the motor core 10 is exactly square to the base portion 16 and coincident with a central axis of the alignment post 12. The rounded or tapered distal portion 18 of the alignment post 12 facilitates quick and convenient reception of the alignment post within the central aperture 30.

The alignment post 12 has an outside diameter substantially equal to an inside diameter of the central aperture 30. Hence, a loose slip fit is formed between the alignment post 12 and an inside surface 42 (FIGS. 1–2) defined by the central aperture 30. The force directed against the inside surface 42 tends to urge each of the metal layers 20 into alignment along the entire height of the laminated stack 10. Because each layer 20 is identical in size and shape, once the layers are aligned, the outer peripheral surface 36 of the laminated stack 10 and the inside surface 42 form a uniformly smooth curved surface. Thus, the alignment post 12 facilitates vertical alignment of the stack 10 while the keys 19 facilitate "rotational" alignment between adjacent layers 20. Alignment of the layers 20 eliminates skew therebetween. As will be described below, use of a chemical adhesive facilitates maintaining alignment without requiring the application of compressive force. Because substantially no compressive force is applied, clamps, jigs, and equipment usually required to apply compressive force are eliminated thereby reducing production costs and increasing efficiency.

Once the laminated stack 10 is placed over the alignment post 12 such that all of the metal layers 20 are aligned, a bead of hardenable adhesive material 50 is flowed along the flat portion 34 of the outer peripheral surface 36. The bead 50 is flowed in a generally vertical orientation between the top lamination 22 and the bottom lamination 24. Preferably, two beads 50 are applied to each flat portion 34 at opposite edges thereof. Of course, any suitable number of beads 50 may be applied depending upon the dimensions of the motor core 10 and the relative dimension of the flat portion 34. Alternately, the motor core 10 may be completely circular in shape, as seen in a top plan view, having no flat portions 34. In this case, the beads 50 are simply flowed along the outer peripheral surface 36 of the laminated stack 10 from the top lamination 22 to the bottom lamination 24 along the curved outer peripheral surface 36. The beads 50 additionally wick between the laminations 20 to further adhere one plate to an adjacent plate.

The beads of adhesive 50 are applied via a tapered nozzle 52 (FIG. 3) that limits the amount of adhesive applied. Due to the specific nature of the chemical adhesive described below, use of a small amount of adhesive, rather than use of a large amount of adhesive, results in a stronger bond. Additionally, use of a relatively small amount of adhesive results in reduced manufacturing costs.

The bead 50 of chemical adhesive is a cyanoacrylate adhesive material or other suitable fast curing adhesive. The chemical adhesive may be sold under the name of SUPER-GLUE or LOCKTITE 420. The adhesive hardens rapidly, typically within ten seconds. Such adhesives are often referred to as rapidly-curing or instantly-curing adhesives, and may harden in about five to fifteen seconds. After the bead of adhesive 50 has hardened, the laminations 20 are fixed in orientation and cannot move relative to each other. Note that the beads of adhesive 50 completely retain the core 10 in an aligned orientation to provide dimensional accuracy and rigidity in the completed core 10. Vertical and rotational alignment (skew) of the layers 20 is achieved solely through use of the chemical adhesive and the simple alignment fixture 14, without the need for complex jigs, clamps, or other devices used to apply compressive force to the core 10.

Use of an instantly-curing cyanoacrylate adhesive eliminates the need for the core 10 to remain on the alignment fixture 14 for an extended period of time. Methods using slow-curing glue either require compressive force to be applied and/or require that the core 10 remain on the fixture and immobile for a relatively long period of time while the adhesive hardens. This results in inefficient use of the manufacturing facility and also requires use of many such fixtures to meet production demands.

After about ten seconds, the fast-curing adhesive has hardened and the core 10 is removed from the alignment fixture 14. At this time, MYLAR insulating sheets or wrappings (not shown) are placed within the slot openings 38, and the windings (not shown) are wound about the slot tooth portions 40. Lead wires (not shown) are then connected and the completed core 10 is varnished.

What is claimed is:

1. A method of manufacturing a motor core having a plurality of metallic plate-like laminations, the method comprising the steps of:

juxtaposing the laminations in a stacked relation along a central axis, the laminations having a central aperture and an outer peripheral surface;

placing the laminations over an alignment post of an alignment fixture to align the laminations, until the laminations rest upon a base portion of the alignment fixture such that substantially no compressive force is applied to the laminations;

the alignment post having an outside diameter substantially equal to an inside diameter of the central aperture so as to form a slip fit therebetween to urge the laminations into full alignment;

flowing at least one bead of cyanoacrylate adhesive material along the outer peripheral surface of the laminations in a generally vertical orientation between a top lamination and a bottom lamination, the adhesive material wicking between the laminations, and when cured, fixing the laminations in a predetermined non-moving orientation;

removing the laminations from the alignment fixture; and applying windings to the laminations.

2. A method of manufacturing a motor core having a plurality of metallic plate laminations, the method comprising the steps of:

juxtaposing the laminations in a stacked relation along a central axis, the laminations having a central aperture and an outer peripheral surface;

placing the laminations over an alignment post of an alignment fixture to align the laminations, until the laminations rest upon a base portion of the alignment fixture such that substantially no compressive force is applied to the laminations;

the alignment post having an outside diameter substantially equal to an inside diameter of the central aperture so as to form a slip fit therebetween to urge the laminations into full alignment;

flowing at least one bead of cyanoacrylate adhesive material along the outer peripheral surface of the laminations while the laminations are on the alignment fixture, in a generally vertical orientation between a top lamination and a bottom lamination such that the adhesive material wicks between the laminations;

allowing the adhesive material to cure before removing the laminations from the alignment fixture, to cause the laminations to be fixed in a predetermined non-moving orientation;

removing the fixed laminations from the alignment fixture; and applying windings to the laminations.

3. The method of claim 1 wherein each lamination includes at least one flat portion forming a chord-like surface on the outer peripheral surface to facilitate reception of the at least one bead of adhesive material thereupon.

4. The method of claim 1 wherein the at least one bead of adhesive material is applied to the at least one flat portion of the lamination.

5. The method of claim 1 wherein the at least one bead of adhesive material is applied to the outer peripheral surface of the lamination.

6. The method of claim 1 wherein the adhesive material is a rapidly-curing adhesive material.

7. The method of claim 1 wherein the adhesive material hardens in about five to fifteen seconds to facilitate fixing the laminations in an aligned orientation.

8. The method of claim 1 wherein the alignment post includes a tapered distal portion to facilitate placement of the laminations over the alignment post.

9. The method of claim 1 wherein the alignment post is disposed at a ninety degree angle relative to the base portion of the alignment fixture.

10. The method of claim 2 wherein each lamination includes at least one flat portion forming a chord-like surface on the outer peripheral surface to facilitate reception of the at least one bead of adhesive material thereupon.

11. The method of claim 2 wherein the at least one bead of adhesive material is applied to the at least one flat portion of the lamination.

12. The method of claim 2 wherein the at least one bead of adhesive material is applied to the outer peripheral surface of the lamination.

13. The method of claim 2 wherein the adhesive material is a rapidly-curing adhesive material.

14. The method of claim 2 wherein the adhesive material hardens in about five to fifteen seconds to facilitate fixing the laminations in an aligned orientation.

15. The method of claim 2 wherein the alignment post includes a tapered distal portion to facilitate placement of the laminations over the alignment post.

16. The method of claim 2 wherein the alignment post is disposed at a ninety degree angle relative to the base portion of the alignment fixture.

* * * * *